(12) United States Patent
Abrams (10) Patent No.: US 7,749,589 B2
(45) Date of Patent: Jul. 6, 2010

(54) FLOCKED ELASTOMERIC ARTICLES

(75) Inventor: Louis Brown Abrams, Fort Collins, CO (US)

(73) Assignee: High Voltage Graphics, Inc., Fort Collins, CO (US)

(*) Notice: Subject to any disclaimer, the term of this patent is extended or adjusted under 35 U.S.C. 154(b) by 254 days.

(21) Appl. No.: 11/533,699

(22) Filed: Sep. 20, 2006

(65) Prior Publication Data

US 2007/0102093 A1    May 10, 2007

Related U.S. Application Data

(60) Provisional application No. 60/719,098, filed on Sep. 20, 2005.

(51) Int. Cl.
*B05D 1/26* (2006.01)
*B03D 27/00* (2006.01)

(52) U.S. Cl. .............. 428/90; 428/95; 428/97

(58) Field of Classification Search .......... 428/90, 428/97, 95
See application file for complete search history.

(56) References Cited

U.S. PATENT DOCUMENTS

| | | | |
|---|---|---|---|
| 1,580,717 A | 4/1926 | Flick | |
| 1,975,542 A | 10/1934 | Forsdale | |
| 1,992,676 A | 2/1935 | Schwarz | |
| 2,047,978 A | 7/1936 | Maclaurin | |
| 2,275,617 A | 3/1942 | Duerr et al. | |
| 2,278,227 A | 3/1942 | Thackeray et al. | |
| 2,477,912 A | 8/1949 | Vallandigham | |
| 2,592,602 A | 4/1952 | Saks | |
| 2,636,837 A | 4/1953 | Summers | |
| 2,835,576 A | 5/1958 | Ensink | |
| 2,981,588 A | 4/1961 | Hyman | |
| 2,999,763 A | 9/1961 | Sommer | |
| 3,099,514 A | 7/1963 | Haber | |
| 3,215,584 A | 11/1965 | McConnell et al. | |
| 3,314,845 A | 4/1967 | Perri | |
| 3,351,479 A | 11/1967 | Fairchild | |
| 3,377,232 A | 4/1968 | Mencock et al. | |
| 3,432,446 A | 3/1969 | Coppeta | |
| 3,459,579 A | 8/1969 | Newman | |
| 3,496,054 A | 2/1970 | Baigas | |
| 3,529,986 A | 9/1970 | Kappas et al. | |
| 3,565,742 A | 2/1971 | Stephens et al. | |
| 3,591,401 A | 7/1971 | Snyder et al. | |

(Continued)

FOREIGN PATENT DOCUMENTS

AU    606651    2/1991

(Continued)

OTHER PUBLICATIONS

"Bicomponent Fibers", available at http://web.utk.edu/~mse/pages/Textiles/Bicomponent%20fibers.htm, Updated Apr. 2004, 8 pages.

(Continued)

*Primary Examiner*—Cheryl Juska
(74) *Attorney, Agent, or Firm*—Sheridan Ross, P.C.

(57) ABSTRACT

In one embodiment, a flocked article is provided that includes an elastomeric film and a plurality of flock fibers on a flocked surface of the film. The flock fibers are embedded in the film.

25 Claims, 3 Drawing Sheets

U.S. PATENT DOCUMENTS

| | | |
|---|---|---|
| 3,630,990 A | 12/1971 | Neal |
| 3,644,267 A | 2/1972 | Jackson, Jr. et al. |
| 3,660,200 A | 5/1972 | Anderson et al. |
| 3,674,611 A | 7/1972 | Petry et al. |
| 3,772,132 A | 11/1973 | Dulin, Jr. |
| 3,775,205 A | 11/1973 | Hermann et al. |
| 3,803,453 A | 4/1974 | Hull |
| 3,837,946 A | 9/1974 | Gribbin |
| 3,887,737 A | 6/1975 | Baxter et al. |
| 3,900,676 A | 8/1975 | Alderson |
| 3,903,331 A | 9/1975 | Klein |
| 3,917,883 A | 11/1975 | Jepson |
| 3,918,895 A | 11/1975 | Mizuno |
| 3,928,706 A | 12/1975 | Gibbons |
| 3,936,554 A | 2/1976 | Squier |
| 3,956,552 A | 5/1976 | Geary |
| 3,961,116 A | 6/1976 | Klein |
| 3,969,559 A | 7/1976 | Boe |
| 3,979,538 A | 9/1976 | Gilman et al. |
| 4,018,956 A | 4/1977 | Casey |
| 4,025,678 A | 5/1977 | Frank |
| 4,031,281 A | 6/1977 | Keeling |
| 4,034,134 A | 7/1977 | Gregorian et al. |
| 4,035,532 A | 7/1977 | Gregorian et al. |
| 4,062,992 A | 12/1977 | Power et al. |
| 4,088,708 A | 5/1978 | Riew |
| 4,142,929 A | 3/1979 | Otomine et al. |
| 4,160,851 A | 7/1979 | Lienert et al. |
| 4,201,810 A | 5/1980 | Higashiguchi |
| 4,218,501 A | 8/1980 | Kameya et al. |
| 4,238,190 A | 12/1980 | Rejto |
| 4,263,373 A | 4/1981 | McCaskey et al. |
| 4,273,817 A | 6/1981 | Matsuo et al. |
| 4,282,278 A | 8/1981 | Higashiguchi |
| 4,292,100 A | 9/1981 | Higashiguchi |
| 4,294,577 A | 10/1981 | Bernard |
| 4,308,296 A | 12/1981 | Chitouras |
| 4,314,813 A | 2/1982 | Masaki |
| 4,319,942 A * | 3/1982 | Brenner .................. 156/72 |
| 4,340,632 A | 7/1982 | Wells et al. |
| 4,352,924 A | 10/1982 | Wooten et al. |
| 4,362,773 A * | 12/1982 | Shikinami .................. 428/90 |
| 4,387,214 A | 6/1983 | Passmore et al. |
| 4,390,387 A | 6/1983 | Mahn |
| 4,396,662 A | 8/1983 | Higashiguchi |
| 4,413,019 A * | 11/1983 | Brenner .................. 427/505 |
| 4,423,106 A | 12/1983 | Mahn |
| 4,430,372 A | 2/1984 | Knoke et al. |
| 4,438,533 A | 3/1984 | Hefele |
| 4,465,723 A | 8/1984 | Knoke et al. |
| 4,588,629 A | 5/1986 | Taylor |
| 4,652,478 A | 3/1987 | Mau |
| 4,668,323 A | 5/1987 | Lenards et al. |
| 4,687,527 A | 8/1987 | Higashiguchi |
| 4,741,791 A | 5/1988 | Howard et al. |
| 4,810,549 A | 3/1989 | Abrams et al. |
| 4,861,644 A | 8/1989 | Young et al. |
| 4,895,748 A | 1/1990 | Squires |
| 4,923,848 A | 5/1990 | Akada et al. |
| 4,931,125 A | 6/1990 | Volkmann et al. |
| 4,980,216 A | 12/1990 | Rompp |
| 5,008,130 A | 4/1991 | Lenards |
| 5,041,104 A | 8/1991 | Seal |
| 5,047,103 A | 9/1991 | Abrams et al. |
| 5,059,452 A | 10/1991 | Squires |
| 5,077,116 A | 12/1991 | Lefkowitz |
| 5,115,104 A | 5/1992 | Bunyan |
| 5,126,182 A | 6/1992 | Lumb et al. |
| 5,155,163 A | 10/1992 | Abeywardena et al. |
| 5,207,851 A | 5/1993 | Abrams |
| 5,298,031 A | 3/1994 | Gabay et al. |
| 5,346,746 A | 9/1994 | Abrams |
| 5,403,884 A * | 4/1995 | Perlinski .................. 524/524 |
| 5,480,506 A | 1/1996 | Mahn, Sr. et al. |
| 5,529,650 A | 6/1996 | Bowers et al. |
| D372,403 S | 8/1996 | Jensen |
| 5,543,195 A | 8/1996 | Squires et al. |
| 5,597,633 A | 1/1997 | Mecke et al. |
| 5,597,637 A | 1/1997 | Abrams et al. |
| 5,681,420 A | 10/1997 | Yamane |
| 5,685,223 A | 11/1997 | Vermuelen et al. |
| 5,756,180 A | 5/1998 | Squires et al. |
| 5,771,796 A | 6/1998 | Morrison et al. |
| 5,858,156 A | 1/1999 | Abrams et al. |
| 5,863,633 A | 1/1999 | Squires et al. |
| 6,010,764 A | 1/2000 | Abrams |
| 6,025,068 A | 2/2000 | Pekala |
| 6,083,332 A | 7/2000 | Abrams |
| 6,110,560 A | 8/2000 | Abrams |
| 6,114,023 A | 9/2000 | Schwarz et al. |
| 6,178,680 B1 | 1/2001 | Sloot |
| 6,224,707 B1 | 5/2001 | Lion |
| 6,247,215 B1 | 6/2001 | Van Alboom et al. |
| 6,249,297 B1 | 6/2001 | Lion |
| 6,350,504 B1 | 2/2002 | Alboom et al. |
| 6,361,855 B2 | 3/2002 | Mahn, Jr. et al. |
| 6,376,041 B1 | 4/2002 | Morrison et al. |
| 6,436,506 B1 | 8/2002 | Pinter et al. |
| 6,676,796 B2 | 1/2004 | Pinter et al. |
| 6,774,067 B2 | 8/2004 | Demott et al. |
| 6,924,000 B2 * | 8/2005 | Tallmadge .................. 427/206 |
| 7,135,518 B2 | 11/2006 | Bandou et al. |
| 7,229,680 B1 | 6/2007 | Crompton |
| 7,344,759 B2 | 3/2008 | Penttinen et al. |
| 7,393,516 B2 | 7/2008 | Seo et al. |
| 7,410,682 B2 * | 8/2008 | Abrams .................. 428/90 |
| 7,461,444 B2 | 12/2008 | Deaett et al. |
| 2001/0008039 A1 | 7/2001 | Alboom et al. |
| 2001/0008672 A1 | 7/2001 | Norvell et al. |
| 2002/0009571 A1 | 1/2002 | Abrams |
| 2002/0098329 A1 | 7/2002 | Abrams |
| 2003/0129353 A1 | 7/2003 | Abrams |
| 2003/0176567 A1* | 9/2003 | Tallmadge .................. 524/589 |
| 2003/0186019 A1 | 10/2003 | Abrams |
| 2003/0207072 A1 | 11/2003 | Abrams |
| 2003/0211279 A1 | 11/2003 | Abrams |
| 2004/0010093 A1* | 1/2004 | Wefringhaus et al. ........ 525/418 |
| 2004/0033334 A1* | 2/2004 | Merovitz .................. 428/90 |
| 2004/0050482 A1 | 3/2004 | Abrams |
| 2004/0053001 A1 | 3/2004 | Abrams |
| 2004/0055692 A1 | 3/2004 | Abrams |
| 2004/0058120 A1 | 3/2004 | Abrams |
| 2004/0081791 A1 | 4/2004 | Abrams |
| 2004/0170799 A1 | 9/2004 | Carr et al. |
| 2005/0081985 A1 | 4/2005 | Abrams |
| 2005/0158508 A1 | 7/2005 | Abrams |
| 2005/0260378 A1 | 11/2005 | Bernabeu |
| 2005/0266204 A1 | 12/2005 | Abrams |
| 2005/0268407 A1 | 12/2005 | Abrams |
| 2006/0026778 A1 | 2/2006 | Lion |
| 2006/0029767 A1 | 2/2006 | Lion |
| 2006/0142405 A1 | 6/2006 | Kijima |
| 2006/0251852 A1 | 11/2006 | Abrams |
| 2006/0257618 A1 | 11/2006 | Bernabeu |
| 2007/0003761 A1 | 1/2007 | Miyazono et al. |
| 2007/0022548 A1 | 2/2007 | Abrams |
| 2007/0026189 A1 | 2/2007 | Abrams |
| 2007/0110949 A1 | 5/2007 | Abrams |
| 2007/0148397 A1 | 6/2007 | Abrams |
| 2007/0289688 A1 | 12/2007 | Abrams |
| 2008/0003399 A1 | 1/2008 | Abrams |
| 2008/0006968 A1 | 1/2008 | Abrams |
| 2008/0050548 A1 | 2/2008 | Abrams |
| 2008/0095973 A1 | 4/2008 | Abrams |

| | | | |
|---|---|---|---|
| 2008/0102239 | A1 | 5/2008 | Abrams |
| 2008/0111047 | A1 | 5/2008 | Abrams |
| 2008/0113144 | A1 | 5/2008 | Abrams |
| 2008/0124503 | A1 | 5/2008 | Abrams |
| 2008/0145585 | A1 | 6/2008 | Abrams |
| 2008/0150186 | A1 | 6/2008 | Abrams |
| 2008/0187706 | A1 | 8/2008 | Lion et al. |

FOREIGN PATENT DOCUMENTS

| | | |
|---|---|---|
| AU | 653994 | 10/1994 |
| CA | 757595 | 4/1967 |
| CA | 2010076 | 8/1990 |
| CA | 1306411 | 8/1992 |
| CA | 2064300 | 9/1992 |
| DE | 3004560 | 8/1981 |
| DE | 19707381 | 8/1998 |
| DE | 19734316 | 2/1999 |
| EP | 0122656 | 10/1984 |
| EP | 0210304 | 2/1987 |
| EP | 0280296 | 8/1988 |
| EP | 0506601 | 9/1992 |
| EP | 0685014 | 12/1995 |
| EP | 0913271 | 10/1998 |
| EP | 0989227 | 3/2000 |
| EP | 1072712 A1 * | 1/2001 |
| EP | 1598463 | 11/2005 |
| FR | 2543984 | 10/1984 |
| FR | 2659094 | 9/1991 |
| FR | 2881149 A1 * | 7/2006 |
| GB | 1171296 | 11/1969 |
| GB | 1466271 | 3/1977 |
| GB | 2065031 | 6/1981 |
| GB | 2101932 | 1/1983 |
| GB | 2126951 | 4/1984 |
| GB | 2214869 | 9/1989 |
| GB | 0506601 | 9/1992 |
| JP | 71007184 | 6/1965 |
| JP | 55079143 | 6/1980 |
| JP | 56107080 | 8/1981 |
| JP | 56108565 | 8/1981 |
| JP | 56141877 | 11/1981 |
| JP | 58062027 | 4/1983 |
| JP | S61-146368 | 7/1986 |
| JP | 62-033576 | 2/1987 |
| JP | 63118544 | 5/1988 |
| JP | 64-014021 | 1/1989 |
| JP | S64-068582 | 3/1989 |
| JP | 01192538 | 8/1989 |
| JP | 01-266284 | 10/1989 |
| JP | 01-310947 | 12/1989 |
| JP | 02048076 | 2/1990 |
| JP | 04-126221 | 4/1992 |
| JP | 04-169297 | 6/1992 |
| JP | 5-201196 | 8/1993 |
| JP | 08-267625 | 10/1996 |
| JP | 11256484 | 9/1999 |
| JP | 2000263673 | 9/2000 |
| JP | 2001270019 | 10/2001 |
| KR | 2003063833 | 7/2003 |
| WO | WO 89/01829 | 3/1989 |
| WO | WO 90/09289 | 8/1990 |
| WO | WO 92/04502 | 3/1992 |
| WO | WO 93/12283 | 6/1993 |
| WO | WO 94/19530 | 9/1994 |
| WO | WO 97/34507 | 9/1997 |
| WO | WO 02/07959 | 1/2002 |
| WO | WO 02/09925 | 2/2002 |
| WO | WO 02/058854 | 8/2002 |
| WO | WO 03/031083 | 4/2003 |
| WO | WO 2004/005023 | 1/2004 |
| WO | WO 2004/005600 | 1/2004 |
| WO | WO 2005/035235 | 4/2005 |
| WO | WO 2005/118948 | 12/2005 |

OTHER PUBLICATIONS

International Search Report for International (PCT) Patent Application No. PCT/US06/36622, mailed Aug. 29, 2007.
Written Opinion for International (PCT) Patent Application No. PCT/US06/36622, mailed Aug. 29, 2007.
U.S. Appl. No. 11/972,440, filed Jan. 10, 2008, Abrams.
U.S. Appl. No. 12/031,445, filed Feb. 14, 2008, Abrams.
"Polymers", Chemistry, Unit 16, date unknonwn, pp. 313-325.
U.S. Appl. No. 09/548,839, filed Apr. 13, 2000, Abrams.
International Preliminary Report on Patentability for International (PCT) Patent Application No. PCT/US06/36622, mailed Apr. 3, 2008.
Bright, Larry. "Trouble Shooting Continuous Thermosol Dyeing of Polyester Fiber and Blends". American Dyestuff Reporter, Aug. 1996, pp. 60-61.
"Bemis—Specialty Films"; available at http://www.benisworldwide.com/products/films.html; 2004; 2 pages.
"Celgard Announces New Products And New Customer"; May 2, 2005; 1 page.
"Characteristics of Commonly Used Elastomers" avaliable at http://www.deerfieldurethane.com/Deerfield-Urethane_Brochure.pdf, date unknown, 4 pages.
"Flockin' to Precision"; Images Magazine; Feb. 1992, 1 page.
"Opposites Attract"; Collano AG, Switzerland, Aug. 2004; 1 page.
"Product Information" Celgard Inc.; available at http://www.celgard.com/products/product-information.cfm; 1 page; undated.
"Fabric Processing Guidelines and Expected Product Attributes," Wellman, Inc., The Fibers Division (Jul. 25, 2001), 8 pages.
"Hettinga: Plastics Technology for the Future, Available Today!" website (circa 2000), 4 pages.
Advertisement,"Clarense" at www.bemisworldwide.com (undated), 2 pages.
Bemis; Sewfree; Adhesive Film for Seamless Apparel Construction; 2002; 1 page.
Bostik USA; "Automotive & Industrial Division: Web & Powder Adhesives" (2002), available at http://www.bostik.com/oem/web_adhesives.html, 2 pages.
Bostik USA; "Industrial Adhesives" (2001), 3 pages.
Bostik USA; Web & Powder Adhesives; 2000; 2 pgs.
Bostik, "Technical Data Sheet PE103 Web Adhesives", revised Feb. 7, 2006, 5 pages.
Brown Abrams, "Flocking A Touch of Velour" ScreenPrinting (Apr. 1987).
Brown Abrams, "Part II: Flocking" ScreenPrinting (Jun. 1987).
Cellusuede Products, Inc, "About Flock", Available at http://www.cellusuede.com/navabout.html, KMK Media Group, copyright 2000, 1 pages.
Cellusuede Products, Inc, "FAQ's", Available at http://www.cellusuede.com/faq.html, KMK Media Group, copyright 2000, 2 pages.
Cellusuede Products, Inc, "Fiber Types", Available at http://www.cellusuede.com/about/types.html, KMK Media Group, copyright 2000, 4 pages.
Cellusuede Products, Inc, "Glossary of Terms", Available at http://www.cellusuede.com/glossary/index.html, KMK Media Group, copyright 2000, 2 pages.
Cellusuede Products, Inc, "Uses for Flock, Home Furnishings", Available at http://www.cellusuede.com/home.html, KMK Media Group, copyright 2000, 2 pages.
Feature Story; Spandex can now be made from Thermoplastic Polyurethane using a new breakthrough flexible Process; Aug. 19, 2002.
Studt et al.; "Versatality on a roll: Thermoplastic adhesive films"; Collano; Oct. 2002; 8 pages.
Declaration of L. Brown Abrams Under 37 CFR § 1.98 for 09/735,721 dated Jan. 16, 2004, 2 pages.
Declaration of L. Brown Abrams under 37 CFR § 1.98 for U.S. Appl. No. 09/621,830 dated Jan. 7, 2003, 2 pages.
Declaration of L. Brown Abrams under 37 CFR § 1.98 for U.S. Appl. No. 10/394,357 dated Jan. 16, 2004, 4 pages with Appendix A-I.

Declaration of L. Brown Abrams under 37 CFR 1.132 for 09/735,721 dated Jan. 7, 2003.
Declaration of L. Brown Abrams under 37 CFR § 1.98 for U.S. Appl. No. 09/621,830 dated Jan. 16, 2004, 2 pages.
Declaration of L. Brown Abrams under 37 CFR § 1.98 for U.S. Appl. No. 10/394,357 dated Jan. 3, 2007, 4 pages with Appendix A-I.
Second Supplemental Declaration of L. Brown Abrams under 37 CFR §1.132 for U.S. Appl. No. 09/548,839 executed Jan. 7, 2003.
Supplemental Declaration of L. Brown Abrams under 37 CFR § 1.132 for U.S. Appl. No. 09/548,839 executed Oct. 23, 2002.
"PolyOne - OnFlexTM-S EH Economy Grades (High Density)", PolyOne® Corporation 2007, pp. 1-2.
"PolyOne - OnFlexTM-S EL Economy Grades (Low Density)", PolyOne® Corporation 2007, pp. 1-2.
"PolyOne - OnFlexTM-S FG Food Contact Grades", PolyOne® Corporation 2007, pp. 12.
"PolyOne - OnFlexTM-S KE Grades for 2K Moulding on Engineered Thermoplastics", PolyOne® Corporation 2007, pp. 1-2.
"PolyOne - OnFlexTM-S Thermoplastic Elastomer Compounds", PolyOne® Corporation 2007, pp. 1-6.
"PolyOne - Synprene RT-3750", PolyOne® Corporation Feb. 9, 2010, 1 page.
"PolyOne - OnFlex™ - S Styrenic Thermoplastic Elastomers", printed Feb. 9, 2010, 2 pages.
"PolyOne - Synprene RT-3790", PolyOne® Corporation Feb. 9, 2010, 1 page.
"PolyOne - Synprene RT-3850MS", PolyOne® Corporation Feb. 9, 2010, 1 page.
"PolyOne - Synprene RT-3870M", PolyOne® Corporation Feb. 9, 2010, 1 page.
"PolyOne - Synprene RT-3770", PolyOne® Corporation Feb. 9, 2010, 1 page.
"Versaflex® OM Series Material Review", TPE Tips, ISSUE 5, GLS Corporation Rev. Jan. 12, 2007, 2 pages.
"Versaflex® OM 3060-1 - Technical Data Sheet", GLS Corporation, available at http://glscorporation.com/gls2/print.jsp?productID=182, Feb. 9, 2010, 2 pages.

* cited by examiner

Fig. 6

FLOCKED ELASTOMERIC ARTICLES

CROSS-REFERENCE TO RELATED APPLICATIONS

The present application claims the benefits of U.S. Provisional Patent Application Ser. No. 60/719,098, filed Sep. 20, 2005, which is incorporated herein by this reference.

FIELD OF THE INVENTION

This application relates generally to designs and transfers and specifically to a flocked stretchable design or transfer.

BACKGROUND OF THE INVENTION

It is often desirable to decorate clothing or other articles with designs that have various surfaces, such as designs that have a flocked surface such that the surface is fuzzy. Using flocked designs works well with clothes or other articles that are not meant to be stretched. To date, flocked designs have not been used with stretchable articles since the flock adhesive layer and, thus, the design, tends to permanently splits or cracks, sometimes without recovery, as the material is stretched. This is undesirable since the design becomes severely deformed. It is also undesirable since the flock fibers may become detached from the transfer or design, leaving permanent holes, voids, or gaps in the design. Another undesirable aspect of using flocked designs on stretchable articles is that the stretchable article may not reform to its original size and shape near the flocked design due to the adhesive used to keep the flocked design on the clothing or article.

Today's fashions are often characterized by stretchable materials, whether the stretchable material is a knitted material, nylon, polyester, elastic or other material. Thus, a wide market of clothing does not use flocked designs because of the undesirable characteristics associated therewith. What is needed is a flocked stretchable design or transfer that can be stretched with the clothing or other article that will reform to its original design without loss of design quality or adhesion or integrity of the image.

SUMMARY OF THE INVENTION

These and other needs are addressed by the various embodiments and configurations of the present invention. The present invention is directly generally to flocked elastic and/or elastomeric films.

In one embodiment of the present invention, flock fibers are embedded in an elastic or elastomeric film by heating the film to a temperature above its softening temperature but below its melting temperature and applying pressure to the fibers. When the film is cooled to a temperature below its softening temperature, the fibers are firmly and permanently held by the film in the absence of an adhesive. The resulting flocked interface between the flock fibers and the elastomeric film can thus be adhesive-free. The film may be contacted with flock by either direct flocking or flocked transfer techniques.

In another embodiment, an article is provided including:

(a) an elastomeric film having a modulus of elasticity of less than about 11.25 lbf, an elongation of at least about 200%, and/or a recovery from elongation of at least about 75%; and (b) a plurality of flock fibers in contact with the elastomeric film.

The interface between the flock fibers and elastomeric film is free of an adhesive other than the elastomeric film.

The article can have a number of advantages relative to the current design articles. For example, the article can be adhesive-free, thereby saving material and labor costs. The elastomeric film itself acts as the adhesive. The flock is forced into the softened and tacky elastomeric film under pressure, such as during lamination. When cooled below the softening point, the flock is held firmly by the film. When a flock transfer is used, misoriented fibers are not received by the softened elastomeric film and stay on the sacrificial carrier. The article, however, may be manufactured using techniques less expensive than flock transfers. The elastomeric film may be coated with a release adhesive, for example, the release adhesive contacted with flock, and the flock later pressed into the elastomeric film when the film is thermally softened. Alternatively, the flock may be applied to the elastomeric film while the film is in the softened state. The electrostatic force may itself be sufficient to embed the fibers in the film. Finally, the unsoftened elastomeric film, may be electrostatically flocked. The residual electrostatic force will hold the flock in position on the film until the film is heated and the fibers pressed into the film.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 2A:
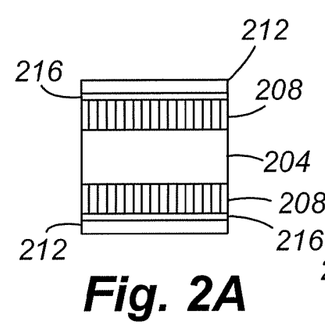
FIG. 2A is a side view of an intermediate flocked heat transfer article according to an embodiment of the present invention.
Figure 2B:
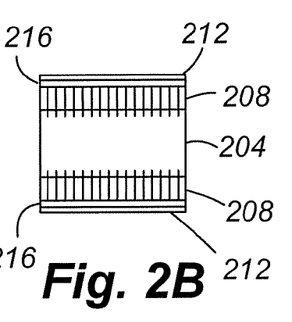
FIG. 2B is a side view of an intermediate flocked heat transfer article according to an embodiment of the present invention.
Figure 2C:
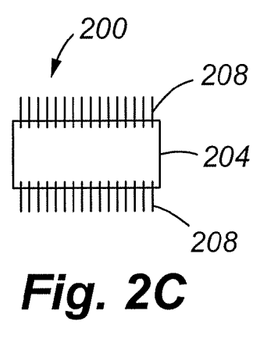
FIG. 2C is a side view of a flocked article according to an embodiment of the present invention.
Figure 3A:
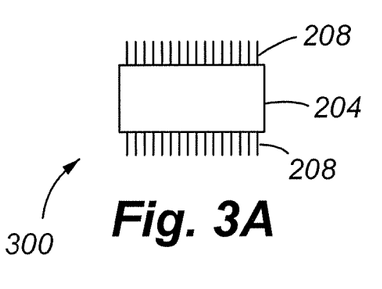
FIG. 3A is a side view of an intermediate direct flocked article according to an embodiment of the present invention.
Figure 3B:
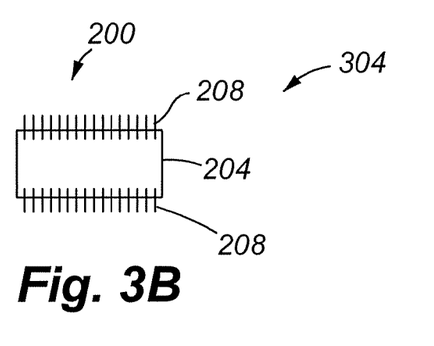
FIG. 3B is a side view of a direct flocked article according to an embodiment of the present invention.

As shown in FIGS. 2C and 3B, a flocked design 200 according to the present invention is shown. The design 200 has an elastomeric film 204 and a plurality of flock fibers 208 embedded in the film 204. A substantial length of each flock fiber is embedded in the film. Preferably, at least about 5%, more preferably at least about 10%, and even more preferably at least about 15% of the length of each fiber is embedded in the film 204.

The elastomeric film 204 should be durable, thermally stable, and able to resist the various treatments including but not limited to flocking and/or lamination process, applying chemicals, washing, heating, drying, both during the flocking process and after the design or transfer has been heat applied to the article. The elastomeric material can be of any suitable composition, such as rubber, polyurethane, and other elastomers. Particularly preferred elastomers include natural vulcanized rubber and other elastomers, such as styrene-butadiene copolymer, polychloroprene (neoprene), nitrile rubber, butyl rubber, polysulfide rubber (Thiokol), cis-1,4-polyisoprene, ethylene-propylene terpolymers (EPDM rubber), silicone rubber, (thermoplastic) polyurethane such as Spandex, and polyurethane rubber. As will be appreciated, "elastomers" refer to synthetic thermosetting (typically high) polymers having properties similar to those of vulcanized natural rubber, namely the ability to be stretched to at least twice their original length and to retract quickly to approximately their original length when released and to un-cross-linked polyolefins that are thermoplastic. "Thermosetting" materials are high polymers that solidify or set irreversibly when heated. This property is typically associated with a cross-linking reaction of the molecular constituents induced by heat or radiation. The material may include curing agents, such as organic peroxides or sulfur. Common thermosetting materials include rubber, (linear) polyethylene, phenolics, alkyds, amino resins, polyesters, epoxides, and silicones. Thermosetting materials have a thermoplastic (reversible or un-cross-linked) temperature regime and a thermosetting (irreversible or cross-linked) temperature regime. "Thermoplastic" materials high polymers that soften when exposed to heat and return to their original condition when cooled to room temperature. Examples of thermoplastic materials include crude rubber, waxes, polyvinyl chloride, nylons, fluorocarbons, (linear) polyethylene, polyurethane, polypropylene, and cellulosic and acrylic resins.

The elastomeric material is preferably elastic. The term "elastic" as used herein means those materials that have the ability to regain, at least substantially, their original shape after a load is removed. The elastic film preferably has a modulus of elasticity of less than about 11.25 pounds per foot ("lbf") (50 N). The modulus of elasticity for the material selected is preferably above about 0.5 lbf (2.22 N) (where the modulus is defined as the force required to pull a ¼ inch sample from 3 inches to 6 inches). As the modulus of elasticity (Young's Modulus) is a fundamental material constant, the modulus is an index of the stiffness of the material. A higher value of the modulus indicates a more brittle material (i.e. glass, ceramics). A very low value represents a elastomeric material (i.e. rubber). The elastic film preferably has an elongation of at least about 200% and more preferably at least about 300% and a recovery of at least about 75% and more preferably at least about 95%. The recovery is the percent of the film's shape retained after the film is stretched to 100% of its original length at a rate of 30 inches per minute and the stretched film allowed to retract freely for 1 minute. The film preferably has an ultimate tensile strength of at least about 1,000, more preferably at least about 2,000, and even more preferably from about 2,000 to about 10,000 psi, and a tear strength of at least about 200, more preferably at least about 250, and even more preferably from about 250 to about 700 PLI.

Preferably, the elastomeric material is a substantially transparent, nonwoven, cast or extended thermoplastic polyester film, with (poly)urethane films being preferred. Even more preferably, the material is Clarense® by Bemis Associates Inc., Lycra® from Du Pont de Nemours Company, and Dorlastan® from Bayer and Dureflex® from Deerfield Urethane.

The elastomeric film 204 preferably is self-supporting and has a thickness ranging from about 1 mil to 25 mils and more preferably, from about 1 mil to 15 mils.

The flock 208 used in any of the processes discussed herein can be any electrostatically chargeable fiber, such as fibers made from rayon, nylon, cotton, acrylic, and polyester. Preferably, the flock preferably has a melting and/or softening point that is greater than and is resilient under the temperatures and pressures experienced in design manufacturing and later application processes to resist softening, deformation, and melting. Due to its low melt point, acrylic flock is undesirable in many applications. Resilient flock, such as rayon, nylon, and terephthalate (e.g., poly(cyclohexylene-dimethylene terephthalate) polymer flock, is particularly preferred. In most applications, the flock orientation is at least substantially orthogonal (perpendicular) to the first side of the elastic film.

Figure 1:
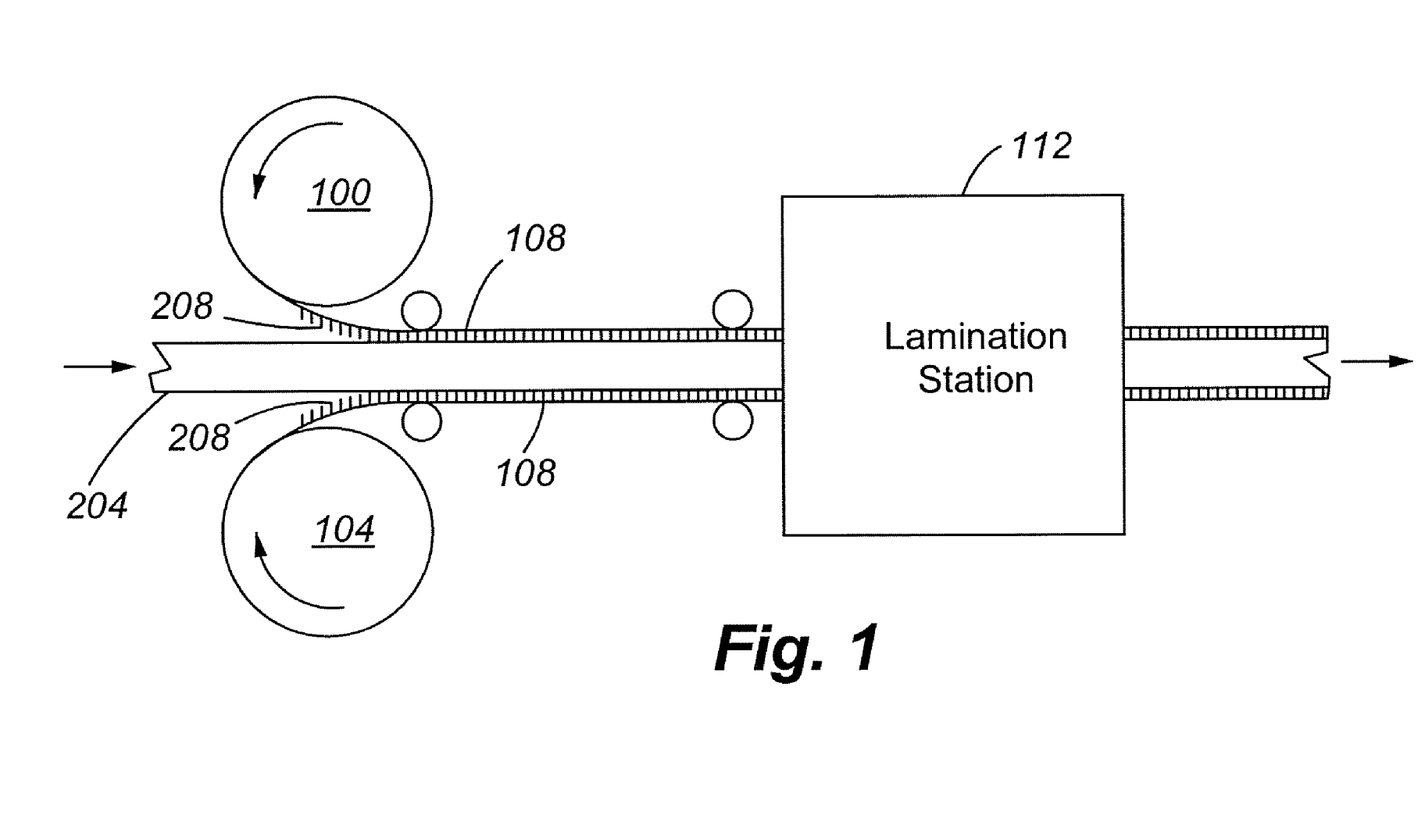
FIG. 1 is a side view of a manufacturing process according to an embodiment of the present invention.

A method to manufacture the design 200 will now be discussed with reference to FIG. 1. In the method, first and second counter-rotating rolls 100 and 104 contain flocked carrier sheets that are contacted with the elastomeric film 204. The contacted assembly formed by flocked carrier sheets 108 on either side of the film 204 is next subjected to heat and pressure in the lamination station 112. The heat raises the temperature of the film 204 to a temperature above its softening temperature but below its melting temperature. The temperature preferably ranges from about 250 to about 400° F. for a time ranging from about 5 to about 30 seconds. In this temperature regime, the elastomeric film 204 exhibits adhesive properties. Pressure is applied to the opposing carrier sheets to embed the free ends of the flock fibers 208 into the film 204. The pressure is at least contact pressure and more preferably is at least about 0.5 psi.

FIGS. 2A-2B demonstrate the various stages of the manufacturing process. FIG. 2A shows the assembly upstream of the station 112. The free ends of the flock fibers 208 contact the opposing sides of the film 204 but generally do not penetrate the sides. In other words, the fibers 208 are not embedded in the film 208. As can be seen from FIG. 2A, each flocked carrier sheet includes a carrier sheet 212 and release adhesive 216. The carrier sheet can be any desirable sacrificial carrier, such as cellulose (paper), microporous substrate (such as described in U.S. Pat. No. 6,025,068 and copending U.S. patent application Ser. No. 11/460,493, filed Jul. 27, 2006, each of which is incorporated herein by this reference), and other known carriers. The release adhesive can be any suitable adhesive, such as those disclosed in any of the above copending U.S. application.

FIG. 2B shows the assembly downstream of the station 112. The free ends of the flock fibers 208 are embedded into the firm 204 and pass through the opposing sides of the film 204. When the temperature of the film 204 is cooled to below the film's softening temperature, the fibers are firmly adhered to the film 204. Thus, the fibers adhere directly to the film substrate without the use of a separate permanent or semi-permanent adhesive.

FIG. 2C shows the final design with the carrier sheet and release adhesive removed from the flock 208 on either side of the film 204. The opposing upper and lower sides of the elastomeric film 204 are coated with flock fibers.

FIGS. 3A and 3B depict a direct flocked article according to an embodiment of the present invention. FIG. 3A depicts the intermediate article 300 upstream of the station 112. The flock 208 is electrostatically attracted to the film 204, is applied to the film 204 using electrostatic direct flocking techniques, and adheres to the upper and lower surfaces of the film 204 in the absence of an adhesive. To make this possible, the film 204 is imparted with an electrical charge opposite to the charge imparted to the adjacent ends of the flock fibers 208. The fibers 208 typically have one end positively charged and the other end negatively charged. Consequently, one end is attracted to the charged film 204 while the other end is repelled by the film 204. This causes the fibers 208 to have a normal or perpendicular orientation relative to the film surface as shown in FIG. 3A.

FIG. 3B depicts the article 304 downstream of the station 112. As noted above, pressure and heat are applied to the upstanding flock fibers to force the fibers down into the film 204 such that the ends of the fibers are embedded in the film.

Figure 4A:
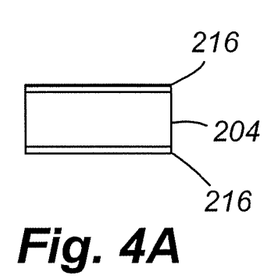
FIG. 4A is a side view of an elastomeric substrate according to an embodiment of the present invention.
Figure 4B:
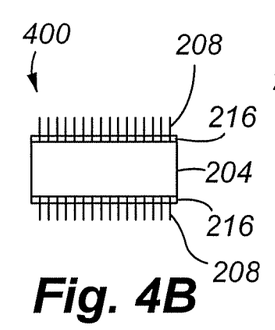
FIG. 4B is a side view of an intermediate direct flocked article according to an embodiment of the present invention.
Figure 4C:
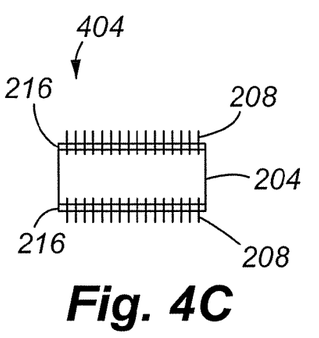
FIG. 4C is a side view of a direct flocked article according to an embodiment of the present invention.

FIGS. 4A-C depict a direct flocked article according to another embodiment of the present invention. FIG. 4A depicts the film 204 prior to direct flocking. The substrate 204 upper and lower surfaces each have a release adhesive layer 216. The release adhesive layer may be applied by suitable techniques, such as by screen printing. FIG. 4B depicts an intermediate article 400 after direct flocking. The flock fibers are embedded in the release adhesive but not in the film 204. After application of heat and pressure in the station 112, the fibers are embedded in the film 204. The release adhesive layer 216 is still in place but covered by the fibers. A user will typically not notice the layer 216 due to the density and plushness of the flocked surface.

While the direct flocked embodiments can be less expensive than the heat transfer embodiment, the heat transfer embodiment has the advantage of removing fibers that are misoriented (i.e., are not normal or perpendicular to the film surface) as they remain on the carrier sheet/release adhesive assembly after removal.

Figure 5A:
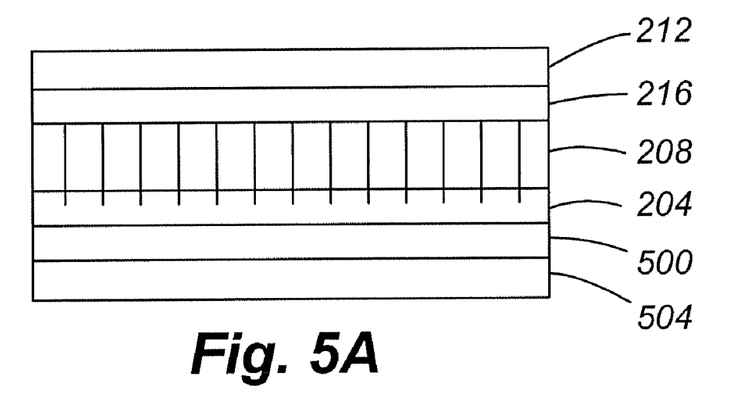
FIGS. 5A and B, respectively, depict a transfer and an article according to another embodiment of the present invention.
Figure 5B:
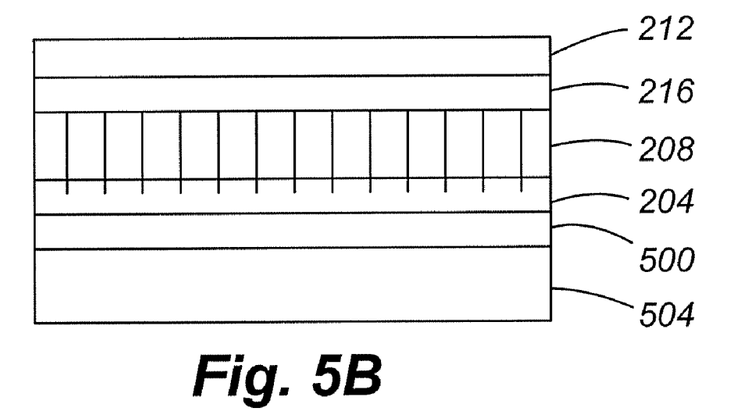
Figure 6:
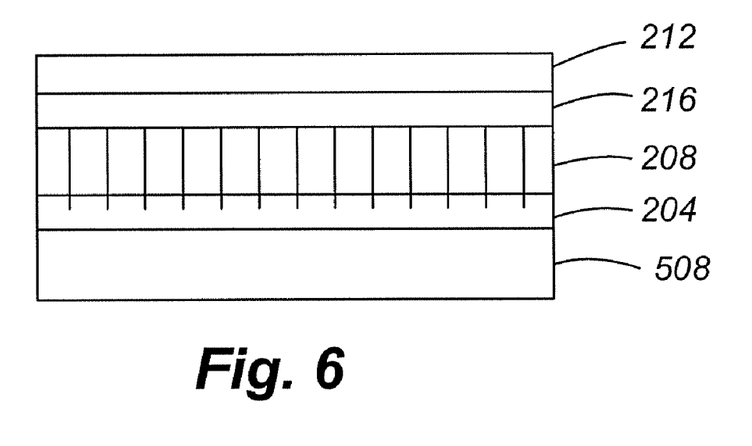
FIG. 6 depicts an article according to another embodiment of the present invention.

In another embodiment shown in FIG. 5, a permanent thermoplastic, hot melt, or thermosetting adhesive 500 is applied to an unflocked surface of the film 204 (which can, for example, be the lower film 204 surface) and the article applied to a substrate 508, such as a textile substrate, using heat transfer techniques. A thermoplastic adhesive 500 is preferred because thermosetting adhesives are generally brittle and therefore relatively inelastic. The permanent thermoplastic adhesive 500 preferably has a melting point less than the melting point of the film 204 to prevent the flock from laying down or becoming misoriented when the article is thermally applied to the substrate 508. Preferably, the melting and/or softening point of the adhesive 500 is at least about 25, more preferably at least about 50, and even more preferably at least about 75 degrees Fahrenheit less than the melting and/or softening point of the film 204. Even more preferably, the melting point of the film 208 ranges from about 375 to about 400 degrees Fahrenheit, and the melting point of the permanent adhesive ranges from about 275 to about 300 degrees Fahrenheit.

In one configuration, the film 500 is a self-supporting, solid adhesive film 500, such as described in copending U.S. patent application Ser. Nos. 09/621,830, filed Jul. 24, 2000; 10/670,091, filed Sep. 23, 2003; 10/455,541, filed Jun. 4, 2003; 09/735,721, filed Dec. 13, 2000; and 10/455,575, filed Jun. 4, 2003, each of which is incorporated herein by this reference. The adhesive film 500 is formed before application to the elastomeric film 204, such as solvent casting the film on a sacrificial carrier 504. When the article is manufactured, the lower roll 104 of transfer 108 is replaced by a roll of the adhesive film 500 and carrier 504, with the free (exposed) surface of the adhesive film 500 facing upwards to adhesively engage the film 204. Thus, the transfer and adhesive film 500 are adhered to the carrier 504 at the same time during lamination. The sacrificial carrier 504 supports the solidified film and is removed after application to the film 204 and before application to the substrate 508. The removal of the carrier 504 is shown in FIG. 5B, which shows the article applied to the substrate 508 in the absence of the carrier 504.

In another configuration, no permanent adhesive film 500 is required to apply the elastomeric film 204 to a desired substrate. This article configuration is formed by replacing the lower roll 104 of transfer 108 with a roll of the substrate 508. Thus, both the flock 208 and substrate 508 are adhered to the film 204 at the same time during lamination. In this configuration, the upper interface between the flock and film 204 and lower interface between the film 204 and substrate 508 are free of an intervening permanent adhesive.

To adhere to a substrate without a further adhesive, the elastomeric film is heated to a temperature sufficient to cause the film to become tacky (which is typically above the softening point) but to a temperature that is less than the temperature used to embed the flock fibers in the film. This maintains desired flock fiber orientation and prevents the flock fibers from being dislodged and/or matted down in the film.

A number of variations and modifications of the invention can be used. It would be possible to provide for some features of the invention without providing others.

For example in one alternative embodiment, only one surface of the film 208 is flocked and the unflocked opposing surface is free of an adhesive. This embodiment may be used to produce a patch.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An article manufactured by the steps of:
   (a) contacting a flock transfer with a surface of an elastomeric film, wherein the flock transfer comprises flock fibers having a length and opposing first and second ends, wherein the elastomeric film has a softening temperature; and
   (b) applying heat and pressure to one or both of the flock transfer and elastomeric film, wherein the applied heat softens at least some of the elastomeric film and wherein the applied pressure embeds at least 5% of the length into the elastomeric film.

2. The article of claim 1, wherein the elastomeric film in step (b) is maintained at a temperature greater than a softening temperature of the elastomeric film while pressure is applied to the transfer.

3. The article of claim 1, wherein the elastomeric film is a thermoplastic polyester elastomeric film, wherein the elastomeric film has a modulus of elasticity of less than about 11.25 lbf, an elongation of at least about 200%, a recovery from elongation of at least about 75%, an ultimate tensile strength ranging from about 1,000 to about 10,000 psi, and a tear strength of at least about 200 PLI and wherein at least about 10% of the flock fiber length of each flock fiber is embedded in the elastomeric film.

4. The article of claim 1, wherein, in step (a), the surface of the elastomeric film is free of an adhesive other than the elastomeric film and wherein the elastomeric film has a thickness ranging from about 1 to about 25 mils.

5. The article of claim 1, wherein step (a) comprises the substeps:
   (a1) applying an adhesive to the surface of the elastomeric film; and
   (a2) applying the flock fibers to the adhesive, wherein step (b) is thereafter performed to embed the fibers into the elastomeric film.

6. The article of claim 1, wherein a first surface of the elastomeric film is in contact with the flock fibers and wherein a second surface of the elastomeric film is in contact with a permanent adhesive, the permanent adhesive having a melting point at least about 50 degrees Fahrenheit less than a melting point of the elastomeric film.

7. The article of claim 1, wherein flock fibers are embedded in each of opposing first and second surfaces of the elastomeric film.

8. The article of claim 1, wherein a first surface of the elastomeric film is in contact with the flock fibers, wherein a second surface of the elastomeric film is in contact with a substrate, the first and second surfaces being in an opposing relationship and wherein the elastomeric film and substrate interface is free of an adhesive other than the elastomeric film.

9. The article of claim 1, wherein the flock transfer further comprises a carrier sheet and a release adhesive and wherein the second ends are positioned adjacent to the release adhesive and wherein the release is positioned adjacent to the carrier sheet.

10. An article, comprising:
    (a) an elastomeric film; and
    (b) a flock transfer comprising a plurality of flock fibers having a length and a release adhesive positioned between a carrier sheet and the plurality of flock fibers, wherein at least about 5% of the flock fiber length is embedded in the elastomeric film.

11. The article of claim 10, wherein the at least 5% of the flock fiber length is substantially free of an adhesive other than the elastomeric film.

12. The article of claim 10, wherein the elastomeric film is an elastomeric thermoplastic polyester film, wherein the elastomeric film has a modulus of elasticity of less than about 11.25 lbf, an elongation of at least about 200%, a recovery from elongation of at least about 75%, an ultimate tensile strength ranging from about 1,000 to about 10,000 psi, and a tear strength of at least about 200 PLI, wherein at least about 10% of the length of each of the flock fibers is embedded in the elastomeric film and wherein the elastomeric film has a thickness from about 1 to about 25 mils.

13. The article of claim 10, wherein a first surface of the elastomeric film is in contact with the flock fibers and wherein a second surface of the elastomeric film is in contact with a permanent adhesive, the permanent adhesive having a melting point at least about 50 degrees Fahrenheit less than a melting point of the elastomeric film.

14. The article of claim 10, wherein the elastomeric film has opposing first and second surfaces having flock fibers embedded therein.

15. The article of claim 10, wherein a first surface of the elastomeric film is in contact with the flock fibers, wherein a second surface of the elastomeric film is in contact with a substrate, and wherein the interface between the elastomeric film and substrate is free of an adhesive other than the elastomeric film.

16. The article of claim 10, wherein the elastomeric film has a thickness from about 1 to about 25 mils, wherein the elastomeric film is selected from the group consisting essentially of polyester films and polyurethane films, wherein elastomeric film has softening and melting temperatures, wherein the softening temperature less than the melting temperature and wherein the softening temperature of the elastomeric film ranges from about 250 to about 400° F.

17. An article, comprising:
    a thermoplastic elastomeric film having a modulus of elasticity of less than about 11.25 lbf, an elongation of at least about 200%, and a recovery from elongation of at least about 75%; and
    a plurality of flock fibers in contact with the thermoplastic elastomeric film, wherein the flock fibers and thermoplastic elastomeric film interface is free of an adhesive other than the thermoplastic elastomeric film.

18. The article of claim 17, wherein, for at least most of the flock fibers, at least about 5% of a fiber length is embedded in the thermoplastic elastomeric film and wherein the thermoplastic film has a thickness of about 1 to about 25 mils.

19. The article of claim 17, wherein the flock fibers are on a first surface of the thermoplastic elastomeric film and further comprising:
    a permanent thermoplastic adhesive in contact with an opposing second surface of the thermoplastic elastomeric film, wherein the permanent thermoplastic adhesive has a softening point that is at least about 50 degrees Fahrenheit less than a softening point of the thermoplastic elastomeric film.

20. The article of claim 17, wherein the flock fibers are on a first surface of the thermoplastic elastomeric film and further comprising:
a substrate in contact with an opposing second surface of the thermoplastic elastomeric film, wherein an interface between the thermoplastic elastomeric film and substrate is free of an adhesive other than the thermoplastic elastomeric film.

21. A flocked article, comprising:
(a) an elastomeric film; and
(b) a plurality of flock fibers on a flocked surface of the film, wherein the flock fibers are embedded in the elastomeric film, wherein a first surface of the elastomeric film is in contact with the flock fibers and wherein a second surface of the elastomeric film is in contact with a permanent adhesive, the permanent adhesive having a melting point at least about 50 degrees Fahrenheit less than a melting point of the elastomeric film.

22. A flocked article, comprising:
(a) an elastomeric film; and
(b) a plurality of flock fibers on a flocked surface of the film, wherein the flock fibers are embedded in the elastomeric film, wherein the flock fibers are embedded in each of first and second surfaces of the elastomeric film.

23. An article, comprising:
an elastomeric film having a modulus of elasticity of less than about 11.25 lbf, an elongation of at least about 200%, and recovery from elongation of at least about 75%;
a plurality of flock fibers in contact with the elastomeric film, wherein the interface between the flock fibers and the elastomeric film is free of an adhesive other than the elastomeric film, wherein the flock fibers are on a first surface of the elastomeric film; and
a permanent thermoplastic adhesive in contact with an opposing second surface of the elastomeric film, wherein the permanent adhesive has a softening point that is at least about 50 degrees Fahrenheit less than a softening point of the elastomeric film.

24. An article manufactured by the steps of:
(a) contacting a flock transfer with a surface of an elastomeric film, wherein the flock transfer comprises flock fibers having a length and opposing first and second ends; and
(b) applying heat and pressure to one or both of the flock transfer and elastomeric film, wherein the applied heat softens at least some of the elastomeric film and wherein the applied pressure embeds at least 5% of the length into the elastomeric film, wherein the elastomeric film is a thermoplastic polyester elastomeric film, wherein the elastomeric film has a modulus of elasticity of less than about 11.25 lbf, an elongation of at least about 200%, a recovery from elongation of at least about 75%, an ultimate tensile strength ranging from about 1,000 to about 10,000 psi, and a tear strength of at least about 200 PLI and wherein at least about 10% of the flock fiber length of each flock fiber is embedded in the elastomeric film.

25. An article manufactured by the steps of:
(a) contacting a flock transfer with a surface of an elastomeric film, wherein the flock transfer comprises flock fibers having a length and opposing first and second ends; and
(b) applying heat and pressure to one or both of the flock transfer and elastomeric film, wherein the applied heat softens at least some of the elastomeric film and wherein the applied pressure embeds at least 5% of the length into the elastomeric film, wherein a first surface of the elastomeric film is in contact with the flock fibers, wherein a second surface of the elastomeric film is in contact with a permanent adhesive, the permanent adhesive having a melting point at least about 50 degrees Fahrenheit less than a melting point of the elastomeric film, and
wherein flock fibers are embedded in each of opposing first and second surfaces of the elastomeric film.

* * * * *